(12) United States Patent
Gunnarsson

(10) Patent No.: US 9,684,188 B2
(45) Date of Patent: Jun. 20, 2017

(54) FRAME JOINT AND HINGE FOR EYEWEAR

(71) Applicant: Gunnar Gunnarsson, Gardabaer (IS)

(72) Inventor: Gunnar Gunnarsson, Gardabaer (IS)

(73) Assignee: Barton Perreira, LLC, Irvine, CA (US)

( * ) Notice: Subject to any disclaimer, the term of this patent is extended or adjusted under 35 U.S.C. 154(b) by 0 days.

(21) Appl. No.: 15/265,356

(22) Filed: Sep. 14, 2016

(65) Prior Publication Data

US 2017/0075135 A1     Mar. 16, 2017

Related U.S. Application Data

(60) Provisional application No. 62/218,856, filed on Sep. 15, 2015.

(51) Int. Cl.
| | |
|---|---|
| *G02C 5/22* | (2006.01) |
| *E05F 1/12* | (2006.01) |
| *E05D 5/10* | (2006.01) |
| *G02C 1/08* | (2006.01) |
| *G02C 5/14* | (2006.01) |

(52) U.S. Cl.
CPC ............ *G02C 5/2254* (2013.01); *E05D 5/10* (2013.01); *E05F 1/1284* (2013.01); *G02C 1/08* (2013.01); *G02C 5/146* (2013.01); *G02C 5/2209* (2013.01); *E05D 2005/102* (2013.01); *G02C 2200/12* (2013.01); *G02C 2200/22* (2013.01)

(58) Field of Classification Search
CPC .......... G02C 1/08; G02C 5/22; G02C 5/2209; G02C 5/2218; G02C 5/2236; G02C 5/2254; G02C 13/001; G02C 2200/06; G02C 2200/22

USPC .................................. 351/90, 113, 114, 153
See application file for complete search history.

(56) References Cited

U.S. PATENT DOCUMENTS

| 5,963,296 A | 10/1999 | Matera |
|---|---|---|
| 6,273,564 B1 | 8/2001 | Wedeck et al. |

(Continued)

FOREIGN PATENT DOCUMENTS

| DE | 3414641 A1 | 10/1985 |
|---|---|---|
| DE | 202009007459 U1 | 8/2009 |
| DE | 202010013199 U1 | 5/2011 |

(Continued)

OTHER PUBLICATIONS

International Search Report and Written Opinion of the ISA for PCT/IB2016/055476, mailed Dec. 6, 2016.

*Primary Examiner* — Huy K Mai
(74) *Attorney, Agent, or Firm* — PatentBest; Andrew McAleavey

(57) ABSTRACT

A hinge and joint for a pair of eyeglasses is disclosed. A split frame has upper and lower rim end pieces that bend and extend rearwardly. A vertically-extending hollow shaft is provided on the end of a temple. A spring or springs are positioned laterally between the rim end pieces and the shaft, such that the shaft bears against the spring or springs. A U-shaped housing fits over the exterior top, bottom, and side of the joint and has a pair of aligned slots in top and bottom flanges. A pin is placed through the aligned slots in the housing and the shaft of the temple. Lateral force provided by the spring or springs biases the joint away from the aligned position, and that force, in combination with upper and lower shoulders on the pin, keep the joint and hinge together.

20 Claims, 4 Drawing Sheets

(56) References Cited

U.S. PATENT DOCUMENTS 7,410,252 B2 * 8/2008 Yang .................. G02C 1/08
                                                351/101
2013/0033675 A1   2/2013 Cheong

FOREIGN PATENT DOCUMENTS

| DE | 102012110169 A1 | 5/2013 |
| FR | 2952443 A1 | 5/2011 |
| JP | 2002296547 A | 10/2002 |

* cited by examiner

FRAME JOINT AND HINGE FOR EYEWEAR

BACKGROUND OF THE INVENTION

1. Field of the Invention

In general, the invention relates to hinges and joints for eyewear.

2. Description of Related Art

Eyeglasses, also called eyewear, have a dual role that is an amalgam of function and fashion. Simply put, one's glasses correct vision, but they are usually chosen because of how they look, or how they complement the wearer's face. Yet although they may be viewed as a fashion accessory, they are an unusual one—a typical pair of glasses may need to survive multiple years of daily wear. In addition, some eyeglasses are specifically designed as safety wear, with lenses and frames designed to sustain impacts or protect the wearer's eyes from certain wavelengths of light.

The joints, hinges, and other components of eyeglass frames are often small. Small components, if not engineered well, may fail outright during use.

Even if the components are well engineered, wear can cause problems with small components. For example, the lens rims of most metal eyeglass frames are split, with the portion of the frame that encircles each lens divided, so that the lens can be inserted. Once the lens is inserted, the two parts of the frame are usually secured together with a small screw. That screw is often under tension, has tiny threads, and can come loose over time, causing a lens to loosen and creating a major inconvenience for the wearer.

SUMMARY OF THE INVENTION

One aspect of the invention relates to a joint and hinge for eyeglasses. A split frame has upper and lower end pieces that terminate in springs. A shaft on the end of a temple sits on the leg of the spring. A U-shaped housing fits over the exterior top, bottom, and side of the joint and has a pair of aligned slots in top and bottom flanges. A dowel pin is placed through the aligned slots in the housing and the shaft of the temple. The joint and hinge thus connects the end pieces of the rim to each other and to the temple with no screws.

Another aspect of the invention relates to a pair of eyeglasses that use a combined joint and hinge, as described above, to join a split rim and create a hinge with a temple.

Other aspects, features, and advantages of the invention will be set forth in the description that follows.

BRIEF DESCRIPTION OF THE DRAWING FIGURES

The invention will be described with respect to the following drawing figures, in which like numerals represent like elements throughout the invention, and in which.

DETAILED DESCRIPTION

Figure 1:
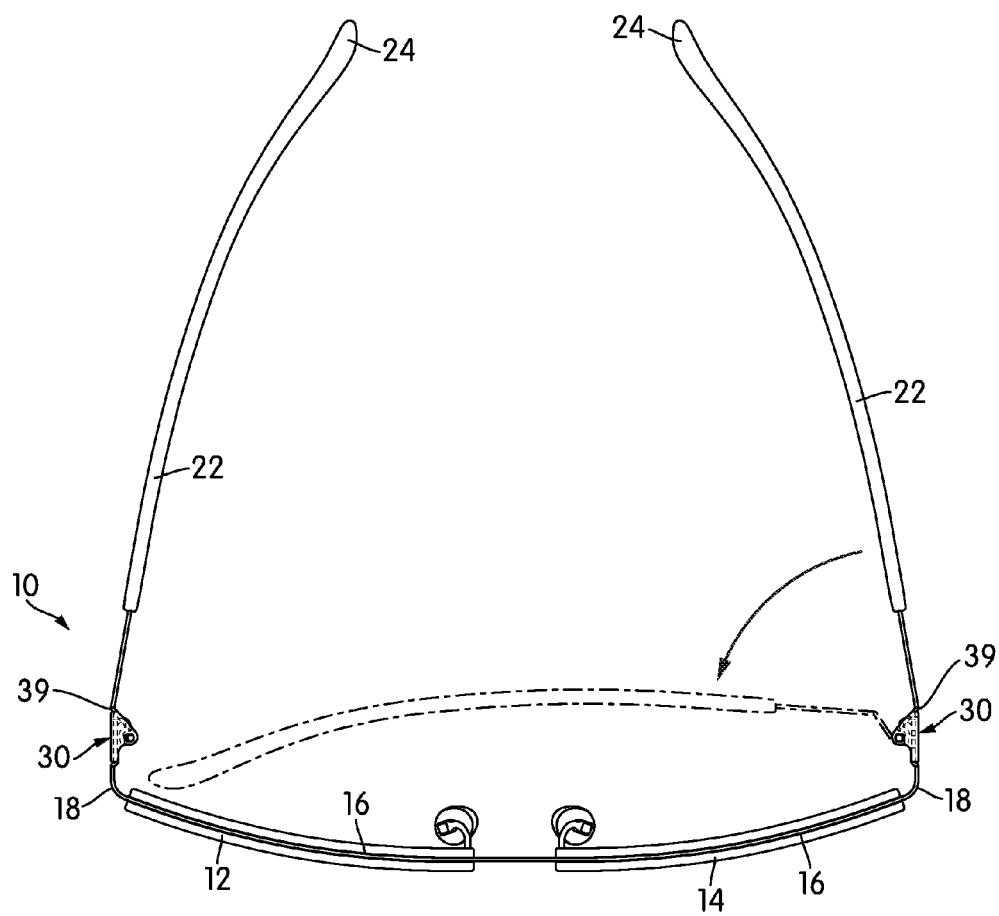
FIG. 1 is a top plan view of a pair of glasses with a joint and hinge assembly according to one embodiment of the invention.
Figure 2:
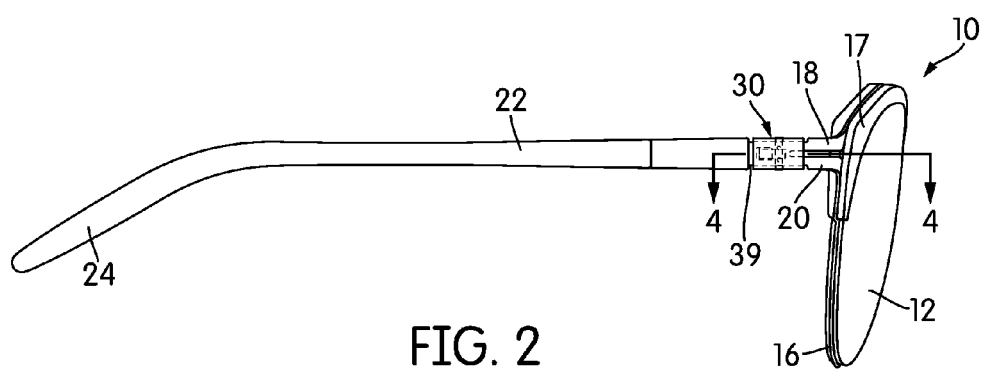
FIG. 2 is a side elevational view of the pair of glasses of FIG. 1.

FIG. 1 is a top plan view of a pair of glasses, generally indicated at 10, according to one embodiment of the invention, and FIG. 2 is a side elevational view of the glasses 10. As with all glasses, the glasses 10 have two lenses 12, 14. A lens rim 16 surrounds each lens 12, 14. While certain portions of this description may assume or indicate that the lenses 12, 14 are corrective lenses, the lenses 12, 14 need not be corrective. The glasses 10 in question may be non-prescription sunglasses, or they may be glasses 10 with lenses 12, 14 that do not correct vision, but serve as eye protection. Additionally, while the glasses 10 of FIGS. 1 and 2 have a certain aesthetic appearance, the functional features described here may be applied to glasses having essentially any aesthetic appearance.

The lens rims 16 and certain other components of the glasses 10 would typically be made of a metal, such as stainless steel or titanium, although many other materials can be used to make eyeglass frames 10, and any suitable material can be used in embodiments of the present invention. Suitable materials also include plastics, like polyvinyl chloride (PVC) and acetate.

In the glasses 10, the upper parts of the rim 16 are accented with plastic 17. The metal of the rim 16 may be set into a channel or groove (not shown in the figures) in the plastic 17, or the plastic 17 may be adhered to or molded over the rim 16. Of course, these details of construction and aesthetics may also vary from embodiment to embodiment. As another example, the rims 16 may be made of thin metal, such as stainless steel or titanium in the popular "aviator" style.

The rims 16 are split in order to accommodate the insertion and seating of the lenses 12, 14. More particularly, each rim 16 has one upper end piece 18 and one lower end piece 20 which make a 90° turn to extend rearwardly of the lenses 12, 14, where they meet the temples 22. The temples 22, as those of skill in the art will appreciate, are the parts of the glasses 10 that extend along the sides of the face, ending in tips 24 that typically extend or hook over the ears.

The glasses 10 have a combined rim joint and hinge, generally indicated at 30, that joins the upper and lower end pieces 18, 20 of the rims 16 and creates a hinged connection that allows the temple 22 to fold with respect to the rest of the frame 10. This differs from most conventional designs for eyeglass frames, in which the rim joint and temple hinge are separate structures, often spaced from one another.

Figure 3:
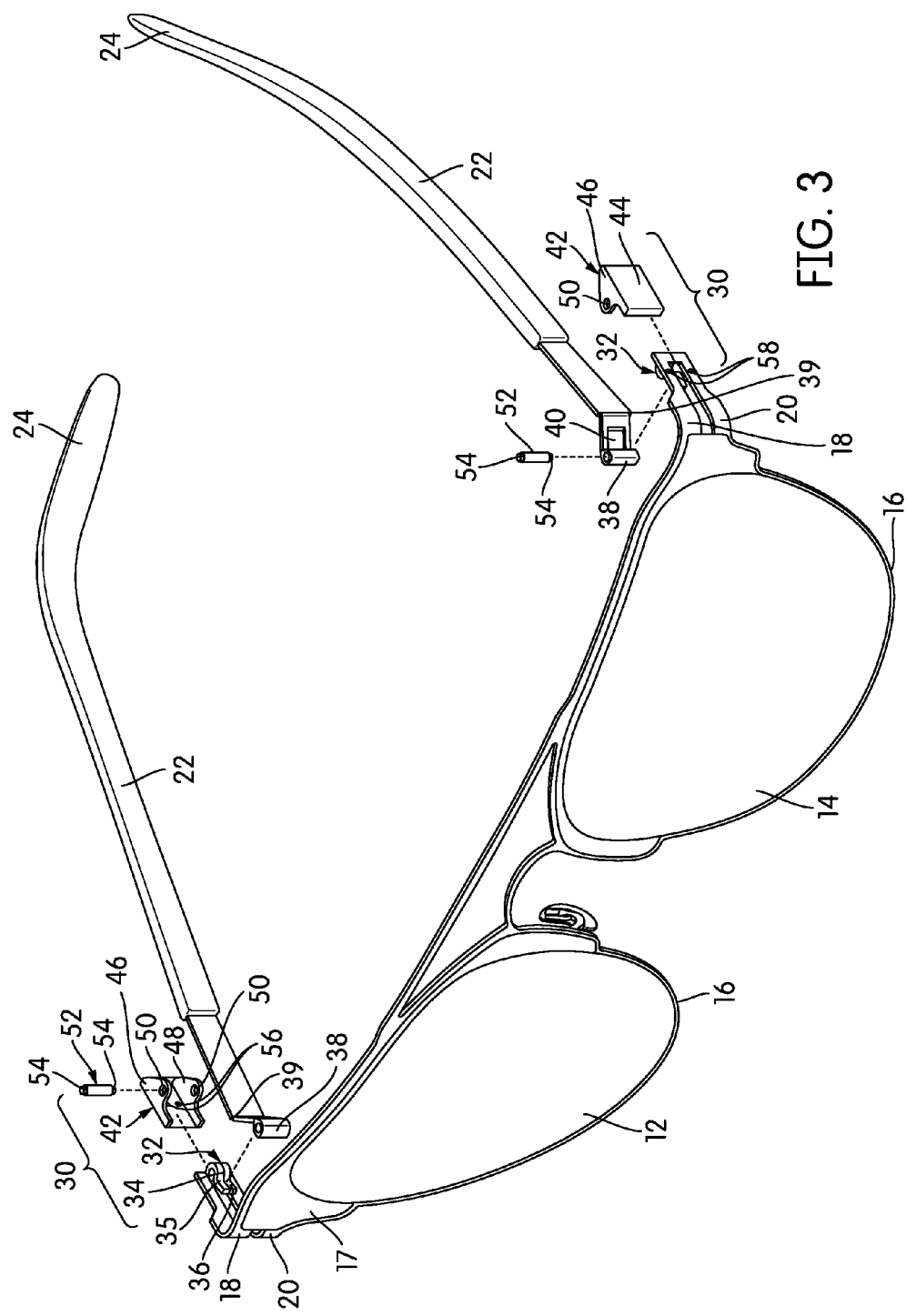
FIG. 3 is an exploded view of the pair of glasses of FIG. 1.

FIG. 3 is an exploded view of the joint and hinge 30. The upper and the lower end pieces 18, 20 fold inwardly, terminating in small springs 32. The springs 32 of the illustrated embodiment are essentially torsion springs with a single, stiff partial coil. The springs 32 are typically made of a material appropriate for a spring, typically a metal, and that material may be different than the material of which the end pieces 18, 20 are made. For example, the springs 32 may be made of titanium and welded or otherwise joined to the end pieces 18, 20. (As those of skill in the art will appreciate, welding, which refers to creating a joint by fusing, i.e., melting the base metal, is only one technique that may be used. Metal parts may be joined, e.g., by soldering, brazing, or adhesives, and plastic parts may be joined by fusing or adhesives. The term "weld," used alone in this context, should be construed to refer to all applicable joining methods.) In other embodiments, instead of welding or joining a separate part to the end pieces 18, 20, a bend, fold, turn, or loop in the end pieces 18, 20 may create a spring 32.

In the illustrated embodiment, each spring 32 makes a first curved turn 34 to form a partial coil, and a second turn 35 to straighten, terminating in a substantially straight leg 36 through which force is transmitted. As can be appreciated from the figures, the springs 32 of the illustrated embodiment are formed of wire with a square or rectangular cross-section, giving the legs 36 substantially flat bearing surfaces. However, in other embodiments, the wire of which the springs 32 are comprised may have a round, oval, or any other type of cross section.

More broadly, although the springs 32 are torsion springs constructed of a single partial loop of wire, many different types of springs may be used in embodiments of the invention. As will become apparent from the description below, essentially any resilient member that can apply lateral force to the joint can be used in an embodiment of the invention. This includes elements like leaf springs and other conventional types of springs. In addition to metals, plastics may be used to make springs 32 in some embodiments. Plastic springs may require more turns or a different overall configuration in order to achieve the necessary stiffness or resilience. In some cases, a spring may be a "lump" or pad of a resilient material, such as a rubber or other polymer, with mechanical properties sufficient to provide the necessary force. For example, a spring in some embodiments of the invention may comprise a pad of silicone rubber, or of another suitable rubber. In essence, anything that is capable of applying lateral resilient force to the joint and is positioned to do so should be considered to be a spring for purposes of this description. Moreover, while the illustrated embodiment uses two springs 32, attached symmetrically to the upper and lower rim end pieces 18, 20, only one appropriately positioned spring is required.

The temple 22 terminates in a squat, vertically-extending hollow shaft 38. The shaft 38 thus extends perpendicular to the length of the temple 22. In the illustrated embodiment, the circumference of the shaft 38 is substantially, but not entirely, round. Instead, the shaft 38 has a detent feature 60 along its outer circumferential surface—i.e., an exterior rounded hump—the purpose of which will be described in more detail below. Of course, the detent feature 60 is optional and may not be present in all embodiments, as will be described below in more detail, and the shaft 38 may thus be completely round in some embodiments. As with the other components of the joint and hinge 30, the shaft 38 may be formed integrally with each temple or welded to it.

The shaft 38 is adapted to rest on and bear against the legs 36 of the springs 32, abutting the second curved turns 35. Just before the shaft 38, the temple 22 defines an opening 40 that is of sufficient size to at least partially admit the first curved turn 34 of the spring 32 when the temple 22 is in the fully open position shown in solid lines in FIGS. 1 and 2. (The folded position of one of the temples 22 is shown in phantom lines in FIG. 1.)

A housing 42 fits over the joint 30. When installed, the housing 42 covers both of the end pieces 18, 20 of the rims 16 and the shaft 38 of the temple 22 and connects those pieces together to form a hinge. The housing 42 has a side plate 44 that is oriented outwardly, to conceal the joint 30, and defines a U-shape, with upper and lower flanges 46, 48. The upper and lower flanges 46, 48 extend generally at a 90° angle from upper and lower edges of the housing 42, respectively. Each flange 46, 48 has a straight-sided open slots with rounded ends 50. (The slots 50 are short and are essentially slightly elongated round holes.) The slots 50 in the two flanges 46, 48 are aligned. A dowel pin 52 is inserted into the slots 50 in the housing 42 and through the hollow shaft 38 of the temple 22 to create a hinge joint, as will be described in more detail below.

In the view of FIG. 3, the housing 42 is a separate component that is placed over the components 18, 20, 38 that it connects. The joint and hinge thus connects the end pieces of the rim to each other and to the temple with no screws. In some embodiments, one or both of the end pieces 18, 20 may be welded to the housing 42.

On the inside of the side plate 44 of the housing 42, two alignment pins 56 are provided that correspond to recesses or holes 58 of complementary shape and size on the upper and lower end pieces 18, 20. When the alignment pins 56 engage the recesses or holes 58, it helps to keep the housing 42 from shifting relative to the temple 22, and vice-versa. Additionally, when the alignment pins 56 engage the recesses or holes 58, the upper and lower end pieces 18, 20 of the rims 16 and the springs 32 of the temples 22 are aligned. Ideally, the recesses 58 in the end pieces 18, 20 are just deep enough to accept the full height of the alignment pins 56, so that the end pieces 18, 20 and housing 42 sit flush with respect to one another. Generally, these alignment pins 56 and the recesses or holes 58 are positioned along a plane in-line with the aligned slots 50 of the flanges 46, 48. Two pins 56 and corresponding recesses 58 are provided in the illustrated embodiment, but there may be more in other embodiments.

As can be appreciated from FIG. 3, the opening 40 in each of the temples 22 is generally rectangular, although any appropriate size or shape of opening may be used, depending on the aesthetics of the glasses 10, as well as the size and shape of the springs 32. (For that matter, the shape of the springs 32 may vary somewhat as long as they are capable of providing force in the necessary direction.) Additionally, the opening 40 is generally centered vertically on the temples 22. However, in other embodiments, the position of the opening 40 may vary somewhat, so long as it provides clearance for the springs 32 and thus allows the temples 22 to open fully. More generally, in other embodiments of the invention, instead of an opening 40, any feature that accommodates the size and shape of the opening 40 may be used, including recesses and pockets along the outside face of the temples 22.

Figure 4:
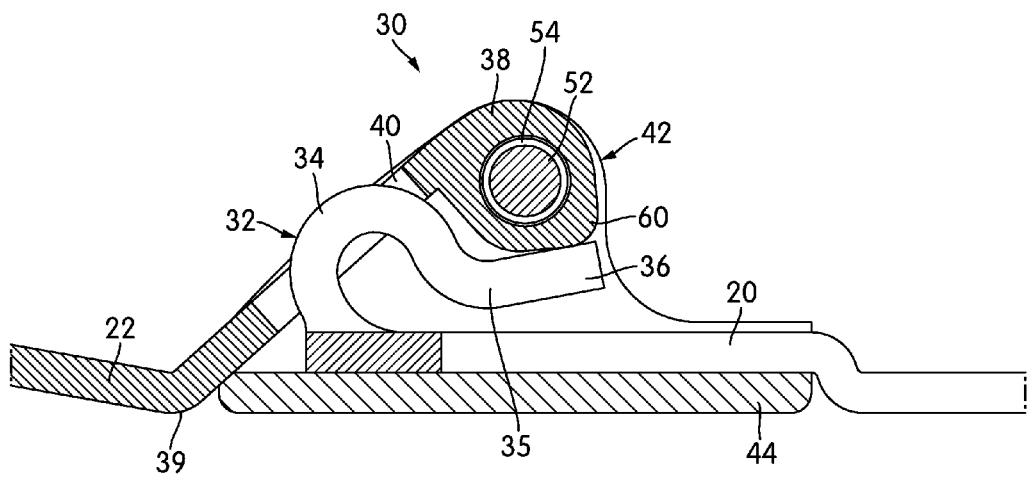
FIG. 4 is a cross-sectional view taken through Line 4-4 of FIG. 2, illustrating the glasses with a temple in the open position.

FIG. 4 is a cross-sectional view taken through Line 4-4 of FIG. 2 illustrating the components of the joint and hinge 30 as engaged with the temples 22. In the position illustrated in FIG. 4, the temple 22 is fully open. As was described briefly above, when assembled, the shaft 38 rests on the legs 36 of the springs 32, and the pin 52 is inserted through the slots 50 in the housing and through the shaft 38.

In order to assemble the components, the shaft 38 is placed on the legs 36 of the springs 32, the housing 42 is placed over the outside of the joint 30, and a pair of pliers or another similar tool is used to squeeze the shaft 38 and the legs 36 of the springs 32 together until the shaft 38 lines up with the two aligned slots 50 in the housing 42. The pin 52 can then be inserted into the aligned slots 50 and the shaft 38. As will be described in more detail below with respect to FIG. 6, once the pin 52 has been inserted its shoulders 54, in combination with lateral pressure from the springs 32, prevent it from falling out.

When the pin 52 is properly inserted, pressure exerted by the springs 32 laterally on the joint 30 keeps the joint 30 engaged because spring pressure biases the shaft 38 toward a position that is out of alignment with the aligned slots 50 on the flanges 46, 48 of the housing 42. As may be apparent from this description and the illustration of FIG. 4, the spring or springs 32 need only be positioned laterally between the shaft 38 and the rim end pieces 18, 20; it is not necessarily critical where or to which component 18, 20, 38 the spring or springs 32 are actually attached.

In order to release the pin 52 and disengage the joint 30, one would again squeeze the joint 30 laterally with a pair of pliers, compressing the springs 32, moving the shaft 38 toward the plate 44, and bringing the slots 50 into alignment with the shaft 38 so that the pin 52 either partially falls out or can be pushed out with a tool. The housing 42 can then be removed and the temple 22 and the end pieces 18, 20 can be separated. Notably, with the combined joint and hinge 30, assembly and disassembly may be easier to achieve than with a conventional eyeglass frame in which a small screw must be inserted and turned until tight.

If the exterior surface of the hollow shaft 38 is round, the temples 22 can assume any position from about 0° to at least 90° with respect to the lenses 12, 14—and this may be desirable in many embodiments. However, in some cases, it may be helpful to bias the temples 22 so that they preferentially assume either a fully open or a fully closed position. For that reason, as was explained above, the exterior surface of the hollow shaft 38 may not be fully round in all embodiments. As was described above, in the illustrated embodiment, the exterior circumferential surface of the hollow shaft 38 has an exterior detent 60—a rounded hump—that biases the temples 22 into either a fully open or fully closed position.

As can also be appreciated from FIG. 4, the temples 22 are bent just before the opening 40, defining an elbow 39. The elbow 39 allows the temples 22 to extend straight rearwardly, at about 90° with respect to the lenses 12, 14, when in the fully open position. Generally speaking, the elbows 39 of the temples 22 follow the angle of the housing 42. More specifically, the elbow 39 may have an angle ranging from about 110-140°, e.g., 130° or 140°; however, the particular angle at which the elbow 39 is defined may vary depending upon the design of the glasses 10. The position of the elbow 39 may vary from embodiment to embodiment along the length of the temples 22. In some cases, the elbow 39 may be immediately adjacent the housing 42, as it is in FIG. 4; in other cases, the elbow 39 may be somewhat distal to or removed from the joint and hinge 30. If the elbow 39 is located distal to or removed from the joint and hinge 30, the temples 22 may appear to bulge outward or be wider than the frames themselves.

Figure 5:
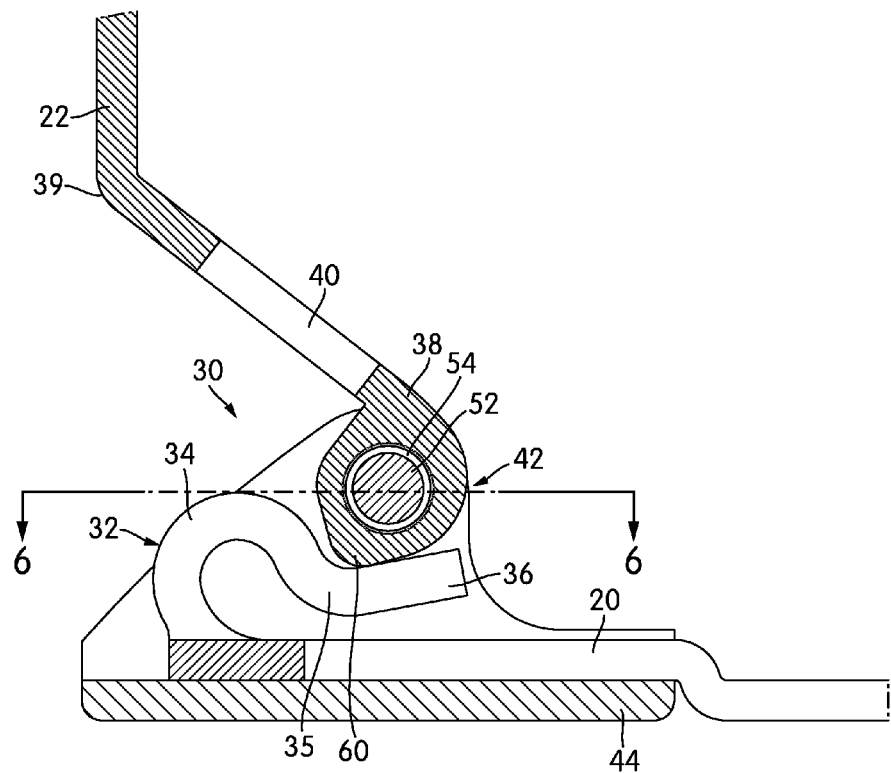
FIG. 5 is a cross-sectional view similar to the view of FIG. 4, illustrating the glasses with a temple in the closed position.

FIG. 5 is a cross-sectional view similar to FIG. 4, illustrating the components of the joint and hinge 30 engaged with the temple 22 in the fully closed position. When the temple 22 is in the fully closed position, the temples 22 cross one another across the width of the eyeglasses 10. Additionally, as FIG. 5 illustrates, in this position, the detent 60 on the shaft 38 has shifted position, and now faces the second turn 35 of the springs 32. As those of skill in the art will appreciate, the detent 60 essentially creates only two stable positions for the temples 22: the position illustrated in FIG. 4 and the position illustrated in FIG. 5. When one moves the temple 22 from the position of FIG. 4 into the position of FIG. 5, the springs 32 may deflect slightly. A partially closed temple 22 will spring open and a partially open temple 22 will spring fully closed. Of course, if the shaft 38 is round, the temple 22 will be stable in any position from 0-90°.

Figure 6:
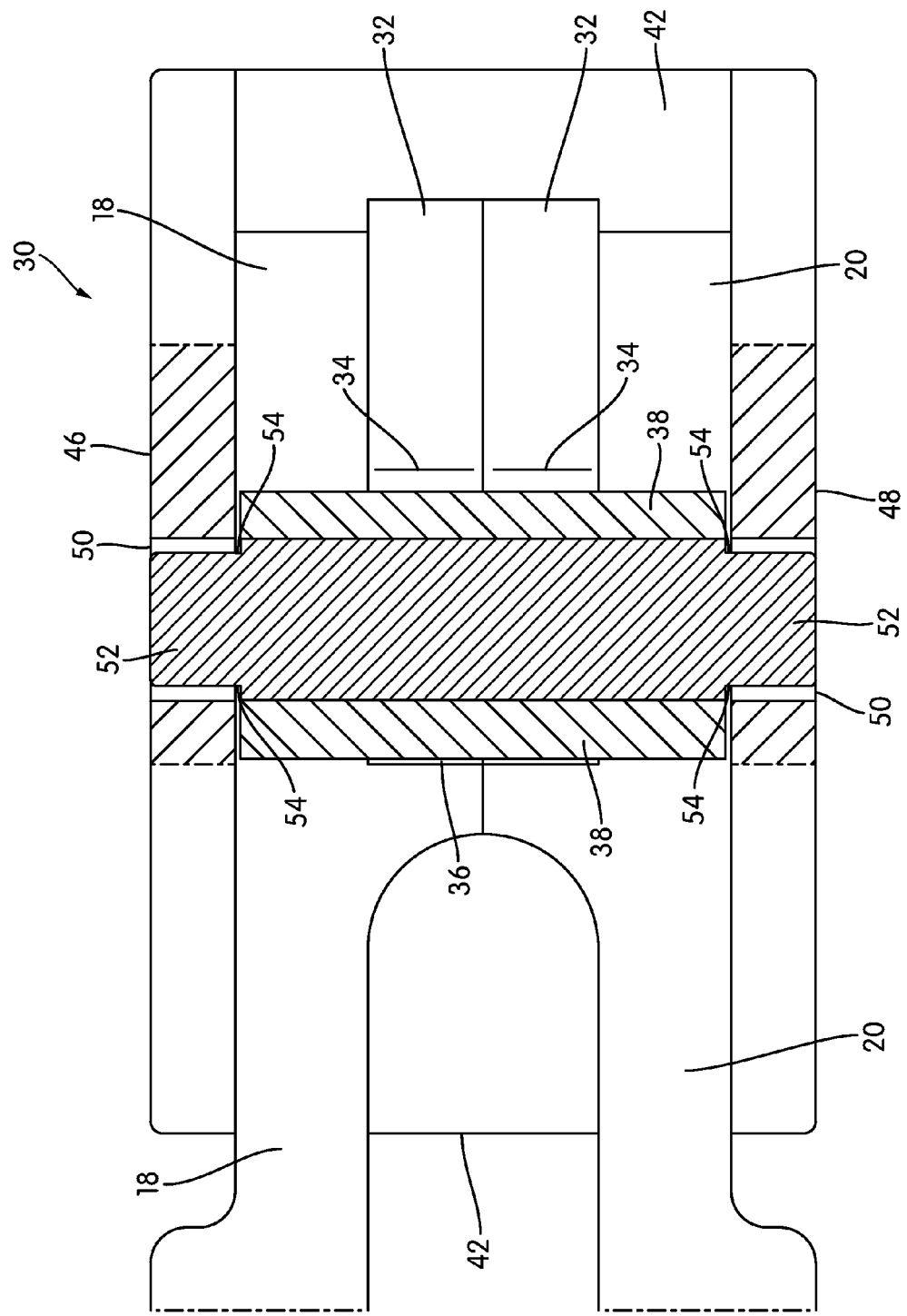
FIG. 6 is a cross-sectional view taken through Line 6-6 of FIG. 5.

FIG. 6 is a cross-sectional view taken through Line 6-6 of FIG. 5, illustrating the joint and hinge 30 with the temple 22 in a fully closed position. The view of FIG. 6 clarifies the arrangement of the housing 42, its slots 50, the shaft 38 of the temple 22 and the pin 52. Also shown in FIG. 6 are the upper and lower ends 18, 20 of the rims 16.

The dowel pin 52, as can be best appreciated by FIG. 6, is cylindrical with parallel sides and is generally made of a strong, wear-resistant material, such as hardened steel. The diameter of the pin 52 is slightly smaller than the interior diameter of the shaft 38, such that the pin 52 may slide freely in and out of the shaft 38, but with a tight tolerance as seen in FIG. 6. The slots 50 are larger than the diameter of the inner channel of the shaft 38. The pin 52 has reductions in diameter on both ends, leaving upper and lower pin shoulders 54.

The pin 52 is sized relative to the shaft 38 such that the shaft 38 terminates where the shoulder 54 is defined. The reductions in diameter on both ends of the pin 52 begin at the shoulder 54 and extend beyond the height of the shaft. In other words, the full diameter portion of the pin 52 is completely contained within the shaft 38. Overall, the pin 52 has about the same height as the housing 42, such that the shoulders 54 are located where the shaft 38 terminates. When the pin 52 is inserted into the joint and hinge 30, the pin 52 does not extend beyond the housing 42. The shaft 38 itself is dimensioned such that it has about the same height as the housing 42; its upper and lower surfaces are adjacent to the interior edges of the flanges 46, 48, forming a flush fit.

As can also be seen in FIG. 6, the pair of springs 32 is centered vertically with respect to the housing 42. The springs 32, each of which is a single partial loop of wire or suitable resilient material, are considerably shorter than the height of the housing 42. One spring 32 is on each end piece 18, 20, but when the end pieces 18, 20 are brought together in the joint 30, the springs 32 are essentially stacked on top of one another. In the illustrated embodiment, the springs 32 are on the end pieces 18, 20 and the hollow shafts 38 are on the temples. However, in other embodiments, the sense of this may be reversed and, for example, the springs 32 may be on the temples 22.

The glasses 10 may be made in a variety of standard sizes to accommodate faces and heads of different sizes, and in addition to the features described here, the glasses 10 may have any other features useful for adapting to fit a particular wearer's face. Moreover, in this description and in the claims, terms like "about" and "generally," when used in association with dimensions, angles, and other numerically-specified characteristics, indicate that the precise values of those characteristics are not critical and may vary a reasonable amount from the numbers or ranges specified, e.g., 1-5%. Of course, and any all characteristics may vary based on manufacturing tolerances and other factors.

While the invention has been described with respect to certain embodiments, the description is intended to be exemplary, rather than limiting. Modifications and changes may be made within the scope of the invention, which is defined by the appended claims.

What is claimed is:
1. A hinge and joint for eyeglasses, comprising:
   upper and lower rim end pieces;
   a generally vertical, generally cylindrical hollow shaft adapted to be attached to a temple;
   at least one spring positioned laterally between the upper and lower rim end pieces and the shaft such that the shaft bears against the at least one spring;
   a housing with an outer plate and upper and lower generally perpendicular flanges, the flanges having a pair of upper and lower aligned slots, the housing being adapted to fit over the at least one spring and the shaft; and a pin sized and configured to be inserted into the upper and lower aligned slots and the hollow shaft;

wherein the at least one spring biases the shaft toward a lateral position out of alignment with the slots of the housing.

2. The hinge and joint of claim 1, wherein the pin has upper and lower reductions in diameter, creating upper and lower shoulders.

3. The hinge and joint of claim 1, further comprising a pair of spaced alignment pins on an interior face of the outer plate.

4. The hinge and joint of claim 3, further comprising a corresponding pair of recesses or openings in the rim end pieces adapted to engage the pair of alignment pins when the housing and the end pieces are engaged.

5. The hinge and joint of claim 1, wherein an exterior circumferential surface of the shaft includes a detent that biases the temple toward fully open and fully closed positions thereof.

6. The hinge and joint of claim 1, wherein the at least one spring comprises two springs, one of the springs connected to each of the upper and lower rim end pieces.

7. The hinge and joint of claim 6, wherein the springs each comprise a single, partial loop.

8. The hinge and joint of claim 7, wherein the springs have a square or rectangular cross-section.

9. A pair of eyeglass frames, comprising:
a pair of left and right split lens rims constructed and adapted to accommodate and secure lenses, each of the left and right split lens rims terminating in respective left and right separate upper and lower rim end pieces, each of the upper and lower rim end pieces extending rearwardly of the pair of frames;
a pair of left and right temples, each of the temples terminating in a substantially vertical, hollow shaft;
springs positioned laterally between the respective rim end pieces and the respective shafts, such that the shafts bear against the springs;
a pair of left and right housings, each housing having an outer plate and upper and lower generally perpendicular flanges, the flanges having a pair of upper and lower aligned slots, the housing being adapted to fit over the at least one spring and the shaft; and
a pair of pins, each pin sized and configured to be inserted into the upper and lower aligned slots and the hollow shaft;

wherein the torsion springs bias the shaft toward a lateral position out of alignment with the slots of the housing.

10. The eyeglass frames of claim 9, wherein each of the pins has upper and lower reductions in diameter, creating upper and lower shoulders.

11. The eyeglass frames of claim 9, further comprising a pair of spaced alignment pins on an interior face of the outer plate of each of the housings.

12. The eyeglass frames of claim 11, further comprising a corresponding pair of recesses or openings in the rim end pieces adapted to engage the pair of alignment pins when the housings and the rim end pieces are engaged.

13. The eyeglass frames of claim 9, wherein an exterior circumferential surface of the shaft includes a detent that biases the temple toward fully open and fully closed positions thereof.

14. The eyeglass frames of claim 9, wherein the springs are attached to the rim end pieces.

15. The eyeglass frames of claim 14, wherein the springs are torsion springs.

16. The eyeglass frames of claim 15, wherein the springs each comprise a single, partial loop of wire.

17. The eyeglass frames of claim 16, wherein the wire is of square or rectangular cross-section.

18. The eyeglass frames of claim 9, wherein each of the temples is bent at an elbow, forming an angled portion that extends parallel to a corresponding angled portion of the housing.

19. The eyeglass frames of claim 18, wherein the angled portion of each temple includes an opening sized and adapted to at least partially admit the springs when the temple is in a fully open position.

20. The eyeglass frames of claim 19, wherein the angled portion of each temple has an angle ranging from about 110-140°.

* * * * *